US010915226B2

(12) United States Patent
Parmar et al.

(10) Patent No.: US 10,915,226 B2
(45) Date of Patent: *Feb. 9, 2021

(54) MOBILE USER INTERFACE TO ACCESS SHARED FOLDERS

(71) Applicant: EMC IP Holding Company LLC, Hopkinton, MA (US)

(72) Inventors: Varun Parmar, San Jose, CA (US); Hironmay Basu, Mountain View, CA (US); Eric Lee, Union City, CA (US); Anand Taralika, Sunnyvale, CA (US); Alok Irde, Santa Clara, CA (US); Patrick Thompson, Sunnyvale, CA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/401,438

(22) Filed: May 2, 2019

(65) Prior Publication Data
US 2019/0258363 A1 Aug. 22, 2019

Related U.S. Application Data

(63) Continuation of application No. 14/501,951, filed on Sep. 30, 2014, now Pat. No. 10,324,586.

(Continued)

(51) Int. Cl.
G06F 3/0482 (2013.01)
G06F 3/0486 (2013.01)
(Continued)

(52) U.S. Cl.
CPC ............ G06F 3/0482 (2013.01); G06F 3/048 (2013.01); G06F 3/0481 (2013.01);
(Continued)

(58) Field of Classification Search
CPC .... G06Q 10/107; G06Q 10/10; G06F 16/245; G06F 3/048; H04L 65/00; H04L 67/00
See application file for complete search history.

(56) References Cited

U.S. PATENT DOCUMENTS 6,208,985 B1 * 3/2001 Krehel ................. G06F 16/248
707/767
7,991,637 B1 8/2011 Guiheneuf
(Continued)

OTHER PUBLICATIONS

"Wechat my favorite feature interface", published on Jan. 11, 2014.*

(Continued)

Primary Examiner — Jennifer N To
Assistant Examiner — Qi Wan
(74) Attorney, Agent, or Firm — Krishnendu Gupta; Peter Jovanovic

(57) ABSTRACT

Systems and techniques to provide access to shared content are disclosed. In various embodiments, a user input indicating a set of selected sharing users that have shared content with a viewing user is received via a filter definition user interface. A combined set of shared content comprising content that has been shared with the viewing user by one or more sharing users included in said set of selected sharing users is determined based at least in part on the indication. A display is provided that includes for at least a subset of shared content in the combined set a user-selectable visual representation of the shared content.

20 Claims, 7 Drawing Sheets

Related U.S. Application Data

(60) Provisional application No. 62/017,744, filed on Jun. 26, 2014.

(51) Int. Cl.

| | | |
|---|---|---|
| *H04L 29/06* | (2006.01) | |
| *G06F 3/0481* | (2013.01) | |
| *H04L 29/08* | (2006.01) | |
| *G06F 3/048* | (2013.01) | |

(52) U.S. Cl.
CPC ........ *G06F 3/0486* (2013.01); *G06F 3/04817* (2013.01); *H04L 65/403* (2013.01); *H04L 67/2823* (2013.01)

(56) References Cited

U.S. PATENT DOCUMENTS

| | | | | |
|---|---|---|---|---|
| 8,195,641 | B2* | 6/2012 | Rucker | G06F 16/2423 |
| | | | | 707/713 |
| 2003/0131062 | A1 | 7/2003 | Miyashita | |
| 2004/0255253 | A1 | 12/2004 | Marcjan | |
| 2004/0266505 | A1 | 12/2004 | Keam | |
| 2005/0246331 | A1* | 11/2005 | De Vorchik | G06F 16/168 |
| 2007/0078938 | A1* | 4/2007 | Hu | G06Q 10/107 |
| | | | | 709/206 |
| 2007/0087682 | A1* | 4/2007 | Dacosta | H04W 48/12 |
| | | | | 455/3.01 |
| 2007/0174787 | A1* | 7/2007 | Rhee | G06F 16/168 |
| | | | | 715/810 |
| 2008/0256458 | A1 | 10/2008 | Aldred | |
| 2008/0288499 | A1* | 11/2008 | Choi | G06F 16/51 |
| 2009/0265416 | A1* | 10/2009 | Svendsen | G06F 16/24556 |
| | | | | 709/203 |
| 2009/0313250 | A1* | 12/2009 | Folting | G06F 16/242 |
| 2010/0223318 | A1 | 9/2010 | Kusakabe | |
| 2010/0241711 | A1* | 9/2010 | Ansari | H04L 12/2812 |
| | | | | 709/205 |
| 2010/0257014 | A1* | 10/2010 | Roberts | G06Q 10/109 |
| | | | | 705/7.19 |
| 2011/0091183 | A1 | 4/2011 | Nakamura | |
| 2011/0173570 | A1 | 7/2011 | Moromisato | |
| 2013/0024805 | A1* | 1/2013 | In | G06F 3/0483 |
| | | | | 715/781 |
| 2013/0205187 | A1 | 8/2013 | Hawkins | |
| 2014/0068401 | A1 | 3/2014 | Kirigin | |
| 2014/0143664 | A1* | 5/2014 | Tsang | G06F 17/24 |
| | | | | 715/256 |
| 2014/0187218 | A1 | 7/2014 | Carrelli | |
| 2014/0325385 | A1 | 10/2014 | Zhang | |
| 2014/0330911 | A1 | 11/2014 | Hunter | |

OTHER PUBLICATIONS

"Wechat which folder can my favorites be found in Wechat", published on Nov. 11, 2013.*

* cited by examiner

MOBILE USER INTERFACE TO ACCESS SHARED FOLDERS

CROSS REFERENCE TO OTHER APPLICATIONS

This application is a continuation of co-pending U.S. patent application Ser. No. 14/501,951, entitled MOBILE USER INTERFACE TO ACCESS SHARED FOLDERS filed Sep. 30, 2014 which is incorporated herein by reference for all purposes, which claims priority to U.S. Provisional Application No. 62/017,744, entitled MOBILE USER INTERFACE TO ACCESS SHARED FOLDERS filed Jun. 26, 2014 which is incorporated herein by reference for all purposes.

BACKGROUND OF THE TECHNOLOGY

File sharing services, such as EMC® Syncplicity®, enable users to share files or other content items with another user or a group of users, and to access files that have been shared by others. A common approach is to put content to be shared in a designated folder and then use the file sharing service to share the folder with others.

In a desktop or laptop environment, a user interface may be provided that includes ample space to display information concerning the folders a user has shared and those that have been shared with the user. Likewise, a tree or other hierarchical view may be used to organize and display simultaneously a relatively large number of shared folders.

Increasingly, users access shared content via mobile devices, e.g., using a mobile application associated with the file sharing service. Mobile device displays, however, typically are much smaller than their desktop and laptop counterparts, and as a result user interfaces created for non-mobile environments are not well-suited to be used on a mobile device.

BRIEF DESCRIPTION OF THE DRAWINGS

Various embodiments of the technology are disclosed in the following detailed description and the accompanying drawings.

DETAILED DESCRIPTION

The technology can be implemented in numerous ways, including as a process; a system; a computer program product embodied on a computer readable storage medium; and/or a processor, such as a processor configured to execute instructions stored on and/or provided by a memory coupled to the processor. In general, the order of the steps of disclosed processes may be altered within the scope of the technology. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the technology is provided below along with accompanying figures that illustrate the technology. The technology is described in connection with such embodiments, but the technology is not limited to any embodiment. The scope of the technology is limited only by the claims and the technology encompasses numerous alternatives, modifications and equivalents. Numerous specific details are set forth in the following description in order to provide a thorough understanding of the technology. These details are provided for the purpose of example and the technology may be practiced according to the claims without some or all of these specific details.

A mobile user interface to navigate shared folders is disclosed. In various embodiments, a filter definition interface is provided to enable a user to define filtering criteria for a shared folder view. For example, in some embodiments a user may specify one or more other users resulting in folders shared by those users appearing in a shared folder view, but not folders shared by users not selected. In some embodiments, color-coding or other visual cues may be used to enable a viewing user to distinguish folders shared by one user from folders shared by a different user.

Figure 1:
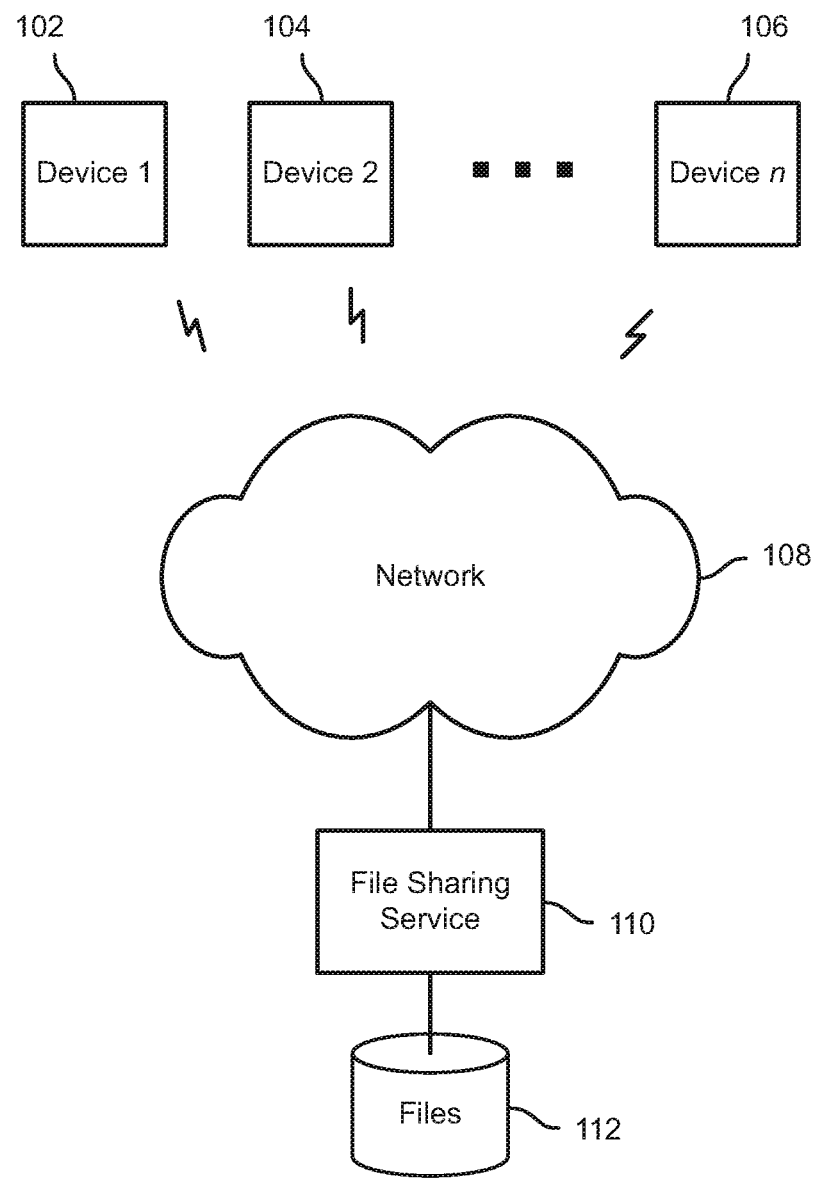
FIG. 1 is a block diagram illustrating an example embodiment of a file sharing system and associated mobile user devices.

FIG. 1 is a block diagram illustrating an example embodiment of a file sharing system and associated mobile user devices. In the example shown, a plurality of mobile devices, represented in FIG. 1 by mobile devices 102, 104, and 106, connect via a network 108 to a file sharing service 110 configured to provide managed access, via share operations defined by users, to files stored in a file storage system and/or device 112. In some embodiments, mobile devices such as devices 102, 104, and 106 each have installed thereon a mobile app configured to run on a mobile operation system of the mobile device and to provide via the mobile app access to services provided by the file sharing service 110. Examples of such services may include, in various embodiments, operations to share a file and/or folder with one or more other specific users and/or groups of users, and operations to view and/or access files and folders that have been shared by other users with a user of the mobile device. In some embodiments, file sharing service 110 comprises the EMC® Syncplicity® file sharing service.

Figure 2:
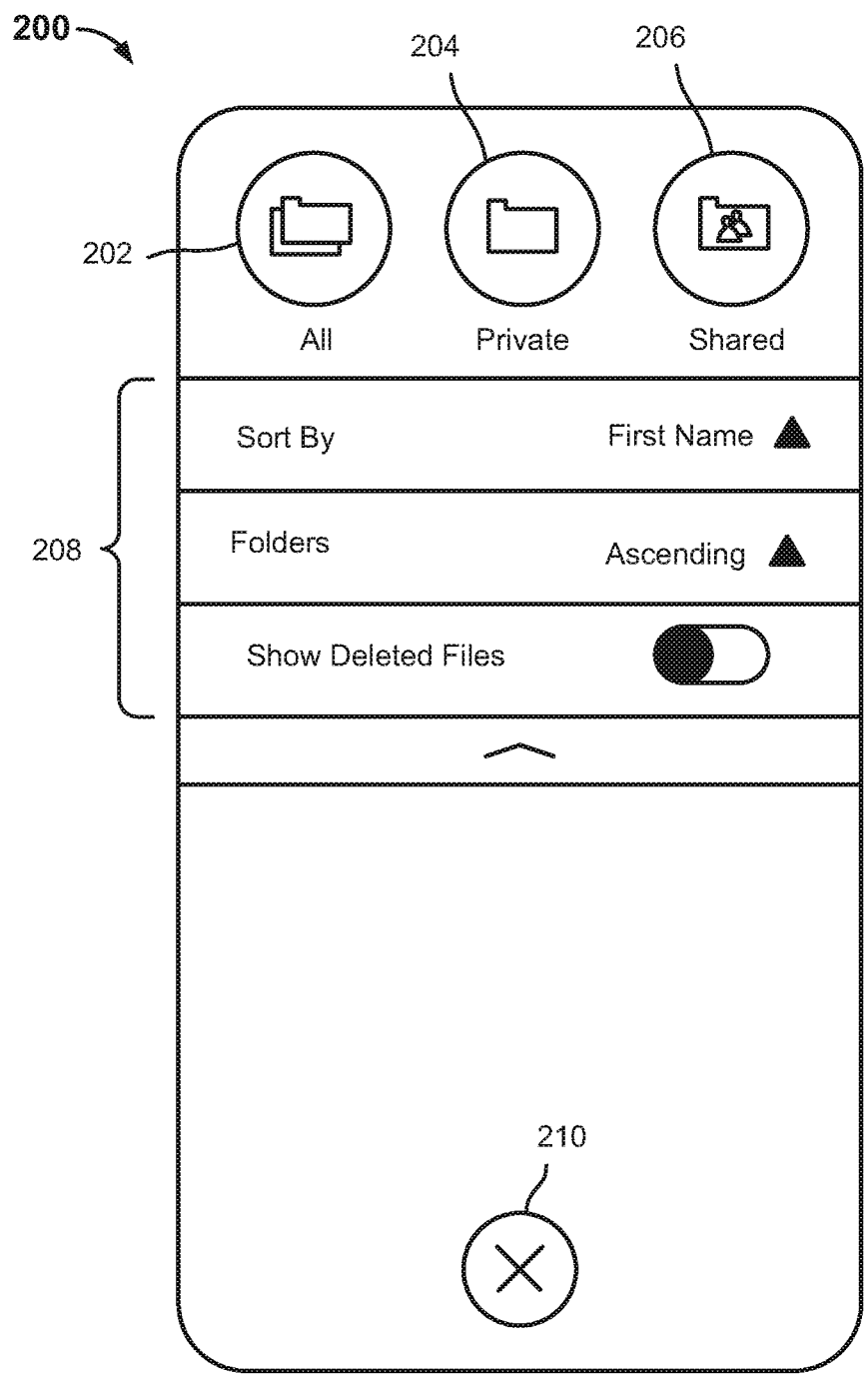
FIG. 2 is a block diagram illustrating an example embodiment of a file sharing service mobile user interface.

FIG. 2 is a block diagram illustrating an example embodiment of a file sharing service mobile user interface. In some embodiments, the file sharing service mobile app user interface 200 of FIG. 2 is provided by a file sharing service mobile app installed on a mobile device, such as devices 102, 104, and 106 of FIG. 1. In various embodiments, the mobile app is configured to provide access to a user of a mobile device on which the mobile app is installed to file sharing services provided by a file sharing service, such as file sharing service 110 of FIG. 1. In the example shown in FIG. 2, file sharing service mobile app user interface 200 includes a set of three view selection icons 202, 204, and 206. Each is selectable by a user, e.g., by touch, to access an associated view. For example, in some embodiments, selection by a user of "All" view selection icon 202 results in a folder view being displayed in which all folders accessible to the user via the file sharing service, e.g., the user's own folders and those that have been shared with the user by others, are displayed. Selection of the "Private" view selection icon 204 results in a folder view being displayed in which only the user's own folders that have not been shared with others by the user are displayed. Finally, selection of the "Shared" view selection icon 204 results in a folder view being displayed in which folders that have been shared with the user by others are displayed. In various embodiments, a subset of folders that have been shared with the user may be displayed. For example, in some embodiments, a user may configure a shared folder user interface filter by selecting, via a filter definition user interface, which other users' folders that have been shared with the viewing user will be displayed in the shared folder view.

Referring further to FIG. 2, in the example shown the file sharing service mobile app user interface 200 further includes a set of preference controls 208, in this example usable to indicate how folders in a selected view are to be sorted (e.g., in this case in ascending alphabetical order by (e.g., sharing) user's first name), whether deleted files/folders are to be displayed, etc. Finally, a dismiss control 210 is provided which, if selected, in some embodiments results in the folder view selection interface 200 of FIG. 2 being dismissed, returning the user, e.g., to a mobile app home page of the file sharing service mobile app.

Figure 3:
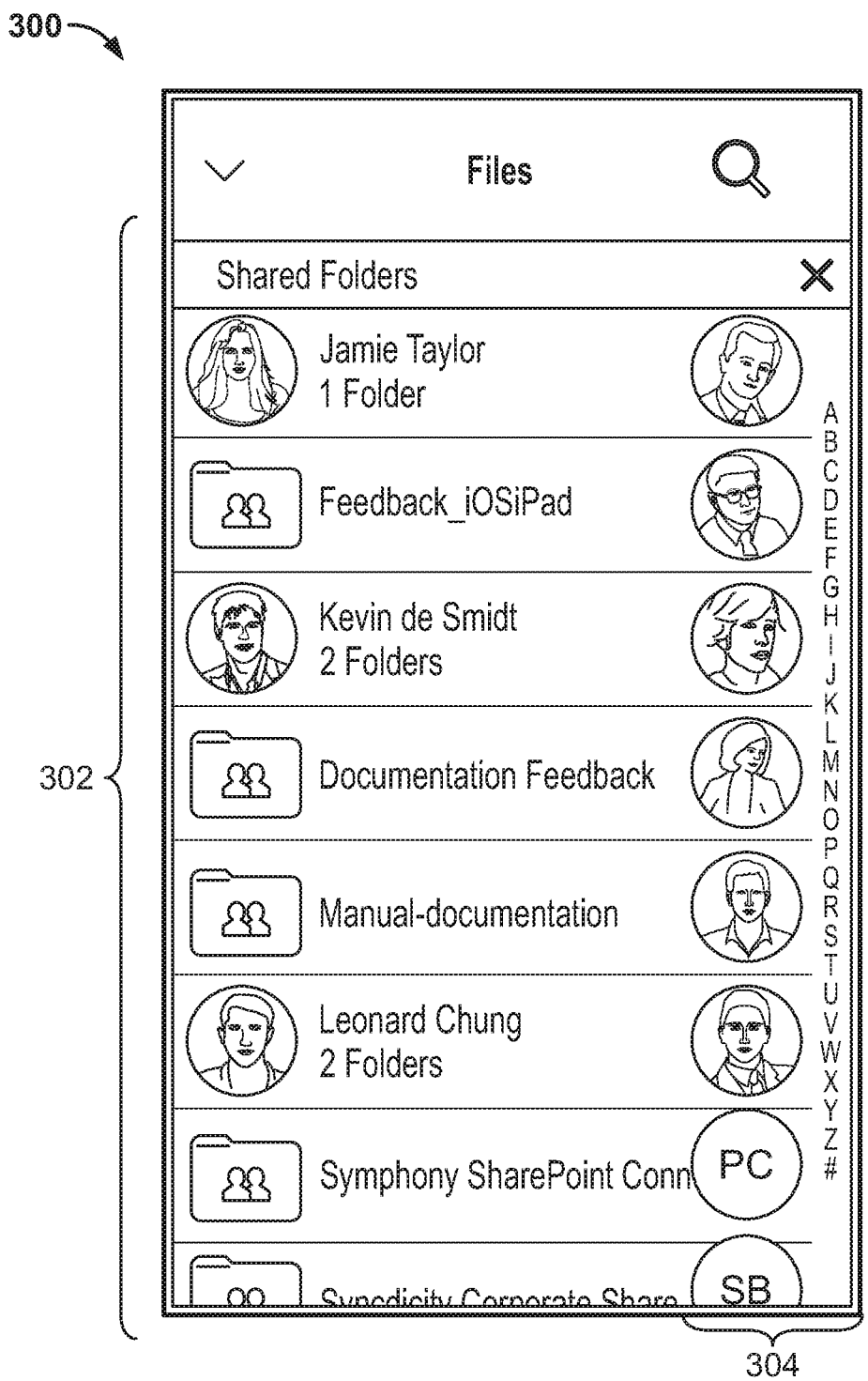
FIG. 3 is a block diagram illustrating a "shared folder" view in an example embodiment of a file sharing service mobile user interface.

FIG. 3 is a block diagram illustrating a "shared folder" view in an example embodiment of a file sharing service mobile user interface. In some embodiments, selection of shared folder view selection icon 206 in the file sharing service mobile app user interface 200 of FIG. 2 results in a shared folder interface such as shared folder interface 300 of FIG. 3 being displayed. In various embodiments, shared folder interface 300 of FIG. 3 may be displayed by a file sharing service mobile app running on a mobile device, such as devices 102, 104, and 106 of FIG. 1. In the example shown, shared folder interface 300 includes a shared folder display area 302 in which user-selectable folder icons representing folders shared by users identified as "Jamie Taylor", "Kevin de Smidt", and "Leonard Chung" are displayed. For each file sharing service user whose folders they have shared with the viewing user (e.g., a user of the file sharing service who is using a mobile device on which the shared folder interface 300 is displayed to access the file sharing service), an icon representing the user (in this example a circular icon with a photographic image of the user's face), the user's name, and the number of folder that the sharing user has shared with the viewing user are displayed. Under each sharing user's information, a user-selectable folder icon is displayed for each folder that has been shared by that user with the viewing user, along with text indicating a name of the shared folder.

In various embodiments, selection by a user of a user-selectable shared folder icon displayed in a shared folder interface, such as shared folder interface 300 of FIG. 3, results in associated file sharing service mobile app application code being invoked to access associated shared folder information (e.g., a list of files included in the shared folder) from the file sharing service and display same in a folder contents view of the file sharing service mobile app. In some embodiments, selection of a file (e.g., an associated icon, link, or other representation) in the context of such a folder contents view results in file sharing service mobile app code being invoked to make a call to the file sharing service to access the associated file. For example, the file (or a portion thereof) may be downloaded to the mobile device on which the file sharing service mobile app is running and, for example, displayed in a display page associated with the mobile app and/or another app configured to render the file (i.e., files of that type), such as an authoring app and/or associated viewer.

In some embodiments, a user of a file sharing service mobile app configured to provide a shared folder interface, such as shared folder interface 300 of FIG. 3, may configure a shared folder view filter to control which sharing users' folders are displayed. For example, a user may select a set of one or more specific sharing users whose folders that have been shared with the viewing user will be displayed in a shared folder view, such as shared folder interface 300 of FIG. 3. In some embodiments, the shared folder view may be filter based on other user-specified filtering criteria, such as date (e.g., of creation, last update, etc.); business unit; product; file or other content type (e.g., no multimedia); file and/or folder size; project or team; etc.

In some embodiments, folders displayed in a file sharing service (or other) mobile user interface, such as shared folder interface 300 of FIG. 3, may be colored-coded, or coded using other displayed attributes, to enable shared folders to be identified by the user quickly. For example, shared folders may have an icon reflecting that they have been shared, such as a cluster of stylized "people" displayed on the front of the folder icon. Folders that have been shared with the user by another may be shown in one color (e.g., blue), while folders the user owns and has shared with others may be shown in a different color (e.g., orange). In some embodiments, folders shared by various different sharing users may be shown in different colors.

In some embodiments, a set of small control icons may be displayed in a corner or at an edge of the mobile display, e.g., the upper right corner. The icons included may vary in some cases based on an application context, e.g., which page of the application the user is on. For example, an icon comprising a "+" sign in a small circle may be used to enable a user to access a view type selection interface. On selection of an icon associated with defining a filter to be used to determine which shared folders are to be displayed, a shared folder filter definition view is displayed.

Referring further to FIG. 3, in various embodiments, the content displayed in a shared folder view, such as shared folder interface 300 of FIG. 3, may be adjusted dynamically. For example, in some embodiments, a "dismiss" or "delete" gesture or set of gestures may be used to remove from shared folder interface 300 of FIG. 3 a sharing user and folders shared by that sharing user. For example, in some embodiments, a user and associated shared folders may be removed from shared folder interface 300 of FIG. 3 by touching in an area in or near where the sharing user's photo/icon and/or name are displayed and swiping to the left. In some embodiments, swiping to the left exposes a "remove" or "delete" button that a user may select to cause the user and that user's associated shared folders to be removed from display in shared folder interface 300 of FIG. 3. In some embodiments, a selecting sharing user and the selected user's associated shared folders may be removed from display in shared folder interface 300 by some other removal input gesture, e.g., by selecting the user (e.g., by touch) and dragging to a dismiss target, such as a circle with an "X" in the middle, which may be caused to be displayed in some embodiments upon selection of a displayed sharing user.

In the example shown in FIG. 3, a user-dismissible address book interface 304 is displayed. In various embodiments, user-dismissible address book interface 304 may be caused to be displayed in shared folder interface 300 by touching the touch responsive display device at the right edge (e.g., at a displayed handle or other control not shown in FIG. 3) and pulling the user-dismissible address book interface 304 out using a dragging gesture to the left, e.g., as one would open a drawer or sliding door. In some embodiments, the user-dismissible address book interface 304 may be used to add sharing users and their associated shared folders to the shared folder interface 300. For example, in some embodiments, selecting a user's icon (in this example showing a photo, when available, and initials if no photo is available) and performing an action associated with a user input to add the selected user's shared folders to those displayed in the shared folder interface 300 will result in folders the selected user has shared with the viewing user being added to those displayed in the shared folder interface 300, e.g., via dynamic update to shared folder interface 300. In some embodiments, selection of a user icon in the user-dismissible address book interface 304 results in a drag and drop target being displayed and other content of shared folder interface 300 being ghosted out or otherwise minimized visually, indicating to the user that the selected sharing user's icon should be dragged to and dropped at the displayed target in order to cause folders that have been shared with the viewing user by the selected user to be added to those displayed in the shared folder interface 300. (See FIG. 6 and associated text for one example of such a drag and drop target interface.) In some embodiments, user-dismissible address book interface 304 may be dismissed (and, as a result, at least temporarily no longer displayed in shared folder interface 300) by touching a location within user-dismissible address book interface 304 and sliding to the right.

Figure 4:
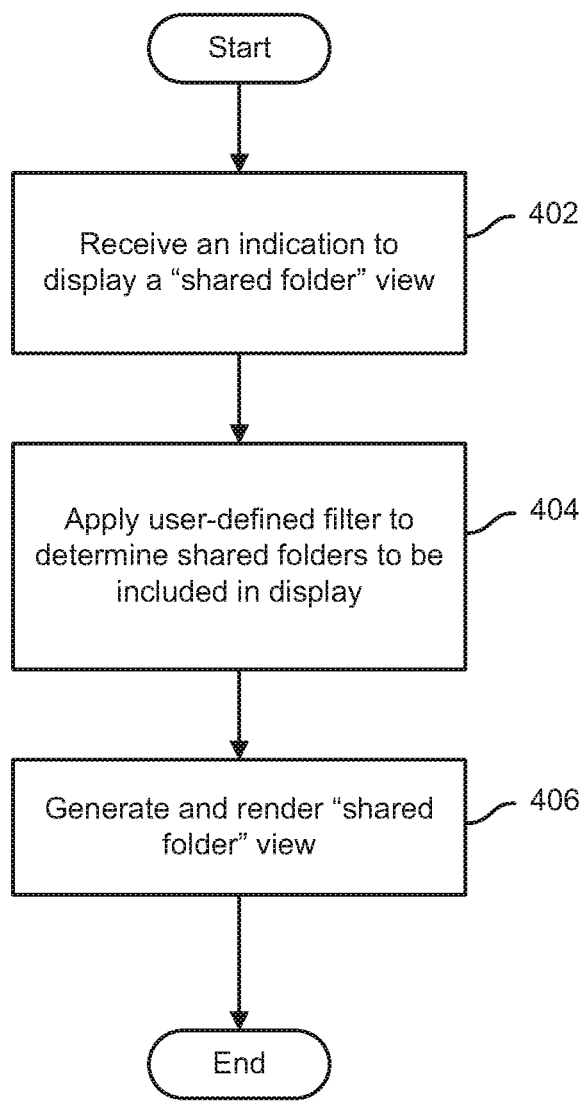
FIG. 4 is a flow chart illustrating an example embodiment of a process to provide a "shared folder" mobile user interface.

FIG. 4 is a flow chart illustrating an example embodiment of a process to provide a "shared folder" mobile user interface. In some embodiments, the process of FIG. 4 may be implemented by a file sharing service mobile app, e.g., one running on a mobile device, such as devices 102, 104, and 106 of FIG. 1. In some embodiments, the process of FIG. 4 may be used to provide a shared folder interface, such as shared folder interface 300 of FIG. 3. In the example shown, an indication is received to display a "shared folder" view (402). For example, a shared folder view selection icon such as icon 206 of FIG. 2 may be selected. A user-defined filter is applied to determine shared folders to be included in the shared folder view to be displayed (404). For example, a filter defined by the viewing user via an interface as described above may be used to indicate which sharing users' folders that have been shared with the viewing user should be included. A shared folder view that includes the shared folders indicated by the user-defined filter is generated and displayed (406), e.g., a view such as "shared folder" interface 300 of FIG. 3. In various embodiments, the view is generated at least in part by retrieving, e.g., from a remote server associated with the file sharing service, information about which folders, if any, have been shared with the viewing user by the sharing users identified in the user-defined filter as being among those sharing users whose folders that have been shared with the viewing user are to be included in the display.

Figure 5:
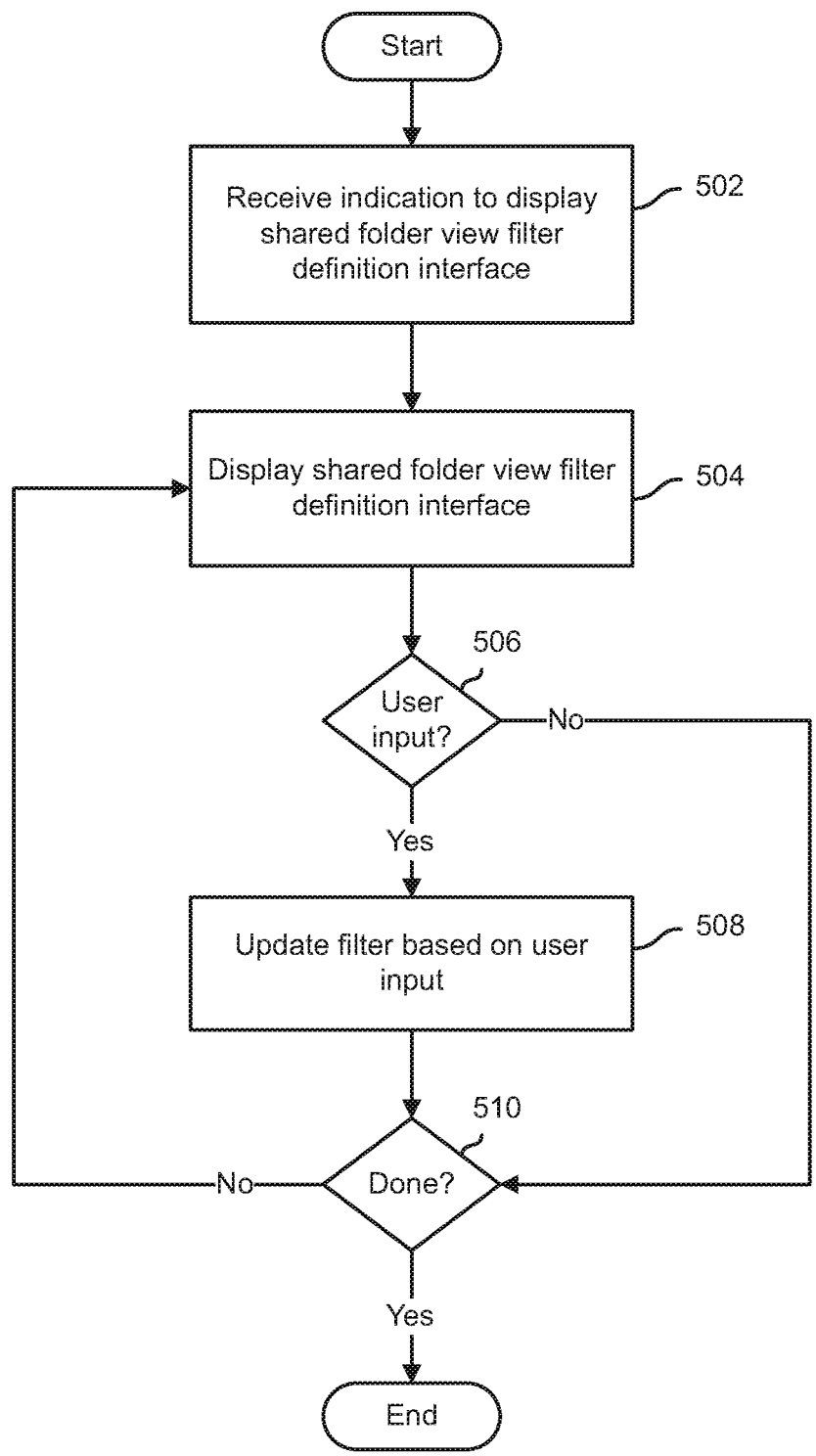
FIG. 5 is a flow chart illustrating an example embodiment of a process to receive a filter definition for a "shared folder" mobile user interface.

FIG. 5 is a flow chart illustrating an example embodiment of a process to receive a filter definition for a "shared folder" mobile user interface. In some embodiments, the process of FIG. 5 may be implemented by a file sharing service mobile app, e.g., one running on a mobile device, such as devices 102, 104, and 106 of FIG. 1. In some embodiments, the process of FIG. 5 may be used to provide a shared folder view filter definition to be used to provide a shared folder interface, such as shared folder interface 300 of FIG. 3. In the example shown, an indication is received to display a shared folder view filter definition interface (502). For example, in some embodiments, selection of a user in user-dismissible address book interface 304 of FIG. 3 may result in a shared folder view filter definition interface being displayed, e.g., the drag and drop target interface described above. In response to the indication, a shared folder view filter definition interface is displayed (504). If user input associated with adding (or removing) a selected user (or group, etc.) from the filter is received (506), the shared folder view filter is updated based on the user input (e.g., the selected user is added to be included) (508). The shared folder view filter definition interface continues to be displayed, and any user input monitored for and, if applicable, responded to, (504, 506, 508) until an indication is received that the shared folder view filter definition interface is no longer to be displayed (510), e.g., the user has not currently selected a sharing user's icon, the user has dismissed the interface, etc.

Figure 6:
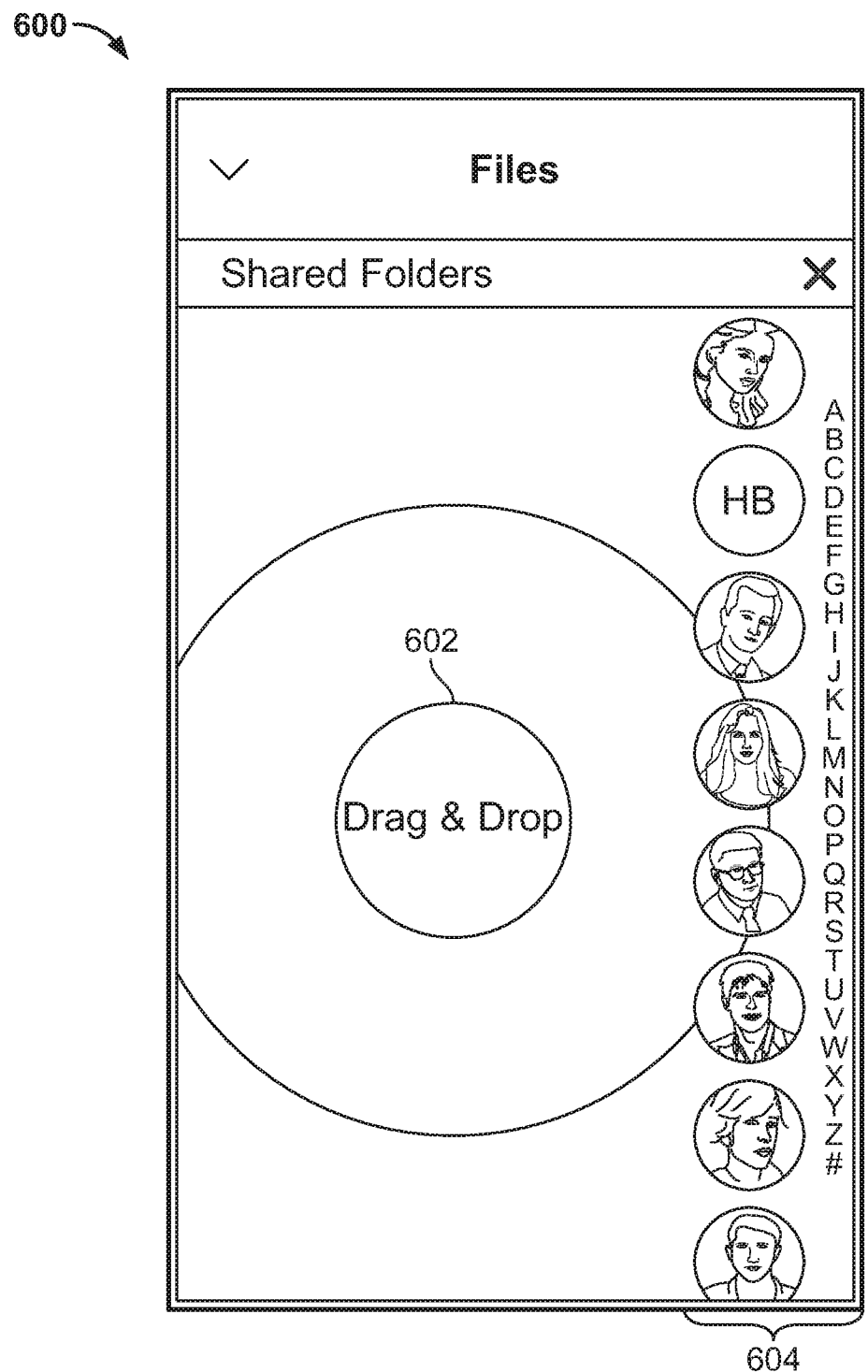
FIG. 6 is a block diagram illustrating a filter definition interface for a "shared folder" view in an example embodiment of a file sharing service mobile user interface.

FIG. 6 is a block diagram illustrating a filter definition interface for a "shared folder" view in an example embodiment of a file sharing service mobile user interface. In some embodiments, the shared folder view filter definition interface 600 of FIG. 6 may be provided by a file sharing service mobile app, e.g., one running on a mobile device, such as devices 102, 104, and 106 of FIG. 1. In some embodiments, the shared folder view filter definition interface 600 is used to implement the process of FIG. 5. In the example shown, shared folder view filter definition interface 600 includes a drag & drop target 602 to which user icons displayed in address book interface 604 can be dragged by a viewing user and dropped to indicate that folders shared with the viewing user by that sharing user are to be included in a shared folder view that is being defined via shared folder view filter definition interface 600.

In some embodiments, shared folder view filter definition interface 600 may be used to build, e.g., progressively, a "shared folder" view, such as shared folder interface 300 of FIG. 3. For example, in some embodiments, the shared folder view as shown in FIG. 3 may be built using the filter definition interface 600 of FIG. 6, e.g., by dragging icons corresponding to users "Jamie", "Kevin", and "Leonard" in this example, into the "drag & drop" target of FIG. 6.

In some embodiments, while viewing folders in the shared folder view, a user may adjust the filters used to determine which shared folders will be displayed by selecting a share user icon and dismissing the icon, such as by dragging the icon to a dismiss zone portion of the user interface (e.g., an area displayed and/or highlighted when a user touches and holds/drags a share user's icon). For example, touching a sharing user's icon in the shared folders view, and dragging and dropping a displayed user's icon to the "dismiss" area will result in some embodiments in shared folders associated with that user being removed from the view. Alternatively, touching a control region may cause the respective icons of users whose shared folders are not yet included in the view currently to be displayed, enabling individual users' icons to be dragged to a target to cause folders they have shared to be added to the filtered view. For example, in FIG. 6, the alphabetically ordered letters on the right may be used to find icons for sharing users, e.g., by first or last name, as configured, and icons for any users who have shared folders with the user using the interface may be displayed, enabling folders that have been shared by that sharing user to be added to the shared folder view.

In some embodiments, the address book-type interface described above can be dismissed by touching and sliding to the right, to reveal the resulting shared folder view, and accessed once again to refine or further define the filtering by touching a tab at the right margin and dragging left, like a drawer. In some embodiments, the address book interface may remain in view, and/or be ghosted out in whole or in part, and accessed again by touching the associated display area, e.g., the right margin area as shown in FIG. 6.

Figure 7:
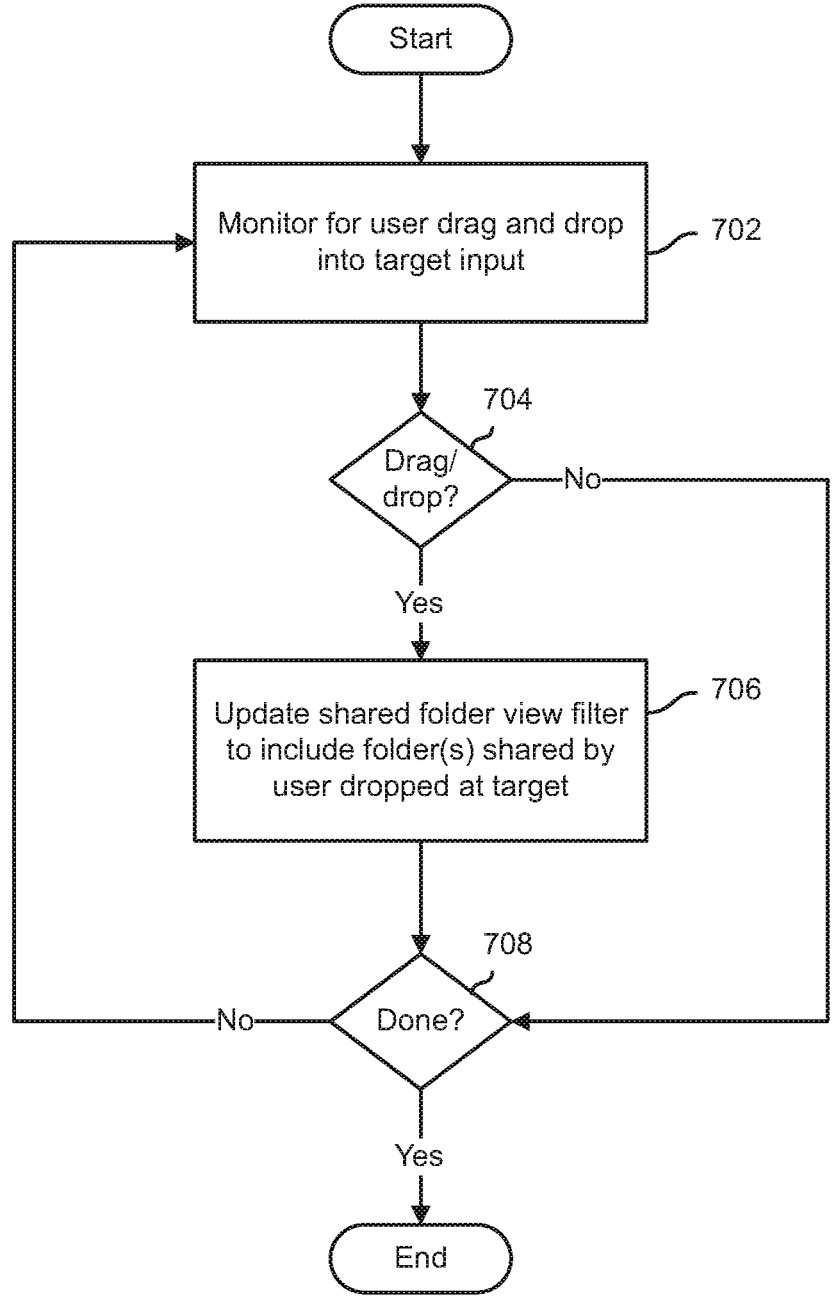
FIG. 7 is a flow chart illustrating an example embodiment of a process to receive a filter definition for a "shared folder" mobile user interface.

FIG. 7 is a flow chart illustrating an example embodiment of a process to receive a filter definition for a "shared folder" mobile user interface. In some embodiments, the process of FIG. 7 may be used to provide a shared folder view filter definition interface, such as the filter definition interface 600 of FIG. 6, and associated functionality. In the example shown, mobile app user interface code monitors for a select (i.e., of a user icon), drag, and drop (in target area) sequence of user gestures (702). If such a select, drag, and drop (in target area) sequence is detected (704), a shared folder view filter is updated to include any folder(s) shared with the viewing user by a sharing user associated with the icon that was selected, dragged, and dropped in the target area (706). Processing continues in the same manner (702, 704, 706) until done (708), e.g., the user dismisses or otherwise navigates away from the shared folder view filter definition interface.

In various embodiments, providing a shared folder view/display/interface as disclosed herein enables a mobile user to define a mobile-friendly display (e.g., one that includes the most useful information in the limited display space available on a typical mobile device), using an interface that is well-suited to being displayed and used on a mobile device.

Although the foregoing embodiments have been described in some detail for purposes of clarity of understanding, the technology is not limited to the details provided. There are many alternative ways of implementing the technology. The disclosed embodiments are illustrative and not restrictive.

What is claimed is:

1. A method, comprising:
selecting, by one or more processors, a set of selected sharing users for which content shared by the set of selected sharing users are to be filtered for a viewing user, wherein the set of selected sharing users is selected based on one or more user inputs, the set of selected sharing users is selected from a set of sharing users that are sharing content with the viewing user, and the selecting the set of selected sharing users comprises:
  determining the set of sharing users that are determined to share content with the viewing user;
  causing a user-dismissible address interface for selecting the set of selected sharing users to be displayed in response to receiving a predefined user input, wherein causing the user-dismissible address interface includes:
    causing selectable icons with each of the selectable icons representing one of the set of sharing users to be displayed on the user-dismissible address interface;
  receiving the one or more user inputs, the one or more inputs selecting at least one of the selectable icons displayed on the user-dismissible address interface; and
  in response to the one or more inputs, selecting the set of selected sharing users from the set of sharing users;
determining, by one or more processors, based on the selected set of sharing users, a combined set of shared content that has been shared with the viewing user by one or more sharing users included in the set of selected sharing users, wherein in response to the one or more inputs selecting the set of selected sharing users, invoking application code of a file sharing service application running on a terminal associated with the viewing user, the application code communicating a call to access information pertaining to one or more files being shared by the one or more sharing users;
displaying at least a subset of shared content in the combined set a user-selectable visual representation of the shared content, the displaying the at least the subset of shared content comprising:
  receiving, via a shared folder filter definition user interface displayed on a display of a mobile terminal, a user input indicating a selected set of shared content to be displayed from among the combined set of shared content; and
  displaying, on a shared folder interface displayed on the display of the mobile terminal, at least part of the selected set of shared content to be displayed;
receiving, by one or more processors, via an interface for the user-selectable visual representation, a selection of an object in the subset of shared content; and
in response to receiving the selection of the object, performing, by one or more processors, a call to a file sharing service to access a file corresponding to the object.

2. The method of claim 1, wherein the combined set of shared content including for each of the one or more sharing users a corresponding set of one or more shared folders that sharing user has shared with the viewing user.

3. The method of claim 1, wherein the one or more user inputs with respect to the one or more sharing users indicate the set of selected sharing users.

4. The method of claim 3, wherein the one or more user inputs indicating the set of selected sharing users is received in connection with a filter definition user interface displayed on a display of a mobile terminal.

5. The method of claim 4, wherein the filter definition includes data identifying one or more sharing users as being members of the set of selected sharing users.

6. The method of claim 4, wherein the filter definition user interface includes a set of sharing user icons each associated with a corresponding sharing user and a displayed drag and drop target area.

7. The method of claim 6, wherein the user input comprises selecting, dragging and dropping at least one sharing user icons in the displayed drag and drop target area indicating the set of selected sharing users.

8. The method of claim 4, wherein the receiving, via the filter definition user interface displayed on a display of a mobile terminal, the one or more user inputs indicating the set of selected sharing users comprises:
receiving a selection of one or more users to be deselected from the set of selected sharing users, the selection of the one or more users to be deselected comprising one or more swipe inputs to one or more corresponding icons associated with the one or more users.

9. The method of claim 1, wherein determining the combined set of shared content includes calling the file sharing service.

10. The method of claim 1, wherein the viewing user comprises a user of the mobile device.

11. The method of claim 1, wherein the user-selectable visual representation comprises a user-selectable folder icon.

12. The method of claim 1, wherein the filter definition user interface enables the viewing user to add sharing users to the set of selected sharing users.

13. The method of claim 12, wherein the display is updated, in response to an added sharing user being added to the set of selected sharing users, to include in the display a represent of shared content associated with the added sharing user.

14. The method of claim 1, wherein the filter definition user interface enables the viewing user to remove a sharing user dynamically from the set of selected sharing users.

15. The method of claim 13, further comprising removing a removed shared content from said display dynamically based at least in part on removal of a removed sharing user dynamically from the set of selected sharing users.

16. The method of claim 1, wherein the one or more user inputs for selecting the set of selected sharing users corresponds to a selection of one or more specific sharing users having content that is shared, the one or more specific sharing users to be filtered for display to the viewing user.

17. The method of claim 1, wherein the set of selected sharing users is a subset of the set of sharing users.

18. The method of claim 1, wherein the predefined user input in response to which the user-dismissible address interface is caused to be displayed is a dragging gesture in a predefined direction.

19. A system, comprising:
a display device; and
one or more processors coupled to the display device and configured to:
select a set of selected sharing users for which content shared by the set of selected sharing users are to be filtered for a viewing user, wherein the set of selected sharing users is selected based on one or more user inputs, and the set of selected sharing users are selected from a set of sharing users that are sharing content with the viewing user, and to select the set of selected sharing users comprises:
determine the set of sharing users that are determined to share content with the viewing user;
cause a user-dismissible address interface for selecting the set of selected sharing users to be displayed in response to receiving a predefined user input, wherein causing the user-dismissible address interface includes:
cause selectable icons with each of the selectable icons representing one of the set of sharing users to be displayed on the user-dismissible address interface;
receive the one or more user inputs, the one or more inputs selecting at least one of the selectable icons displayed on the user-dismissible address interface; and
in response to the one or more inputs select the set of selected sharing users from the set of sharing users;
determine, based on the selected set of sharing users, a combined set of shared content that has been shared with the viewing user by one or more sharing users included in the set of selected sharing users, wherein in response to the one or more inputs selecting the set of selected sharing users, invoking application code of a file sharing service application running on a terminal associated with the viewing user, the application code communicating a call to access information pertaining to one or more files being shared by the one or more sharing users;
display a display that includes for at least a subset of shared content in the combined set a user-selectable visual representation of the shared content, to display the at least the subset of shared content comprises:
receive, via a shared folder filter definition user interface displayed on a display of a mobile terminal, a user input indicating a selected set of shared content to be displayed from among the combined set of shared content; and
display, on a shared folder interface displayed on the display of the mobile terminal, at least part of the selected set of shared content to be displayed;
receive, via an interface for the user-selectable visual representation, a selection of an object in the subset of shared content; and
in response to receiving the selection of the object, perform a call to a file sharing service to access a file corresponding to the object.

20. A computer program product, the computer program product being embodied in a non-transitory computer readable storage medium and comprising computer instructions for:
selecting a set of selected sharing users for which content shared by the set of selected sharing users are to be filtered for a viewing user, wherein the set of selected sharing users is selected based on one or more user inputs, and the set of selected sharing users are selected from a set of sharing users that are sharing content with the viewing user, and the selecting the set of selected sharing users comprises:
determining the set of sharing users that are determined to share content with the viewing user;
causing a user-dismissible address interface for selecting the set of selected sharing users to be displayed in response to receiving a predefined user input, wherein causing the user-dismissible address interface includes:
causing selectable icons with each of the selectable icons representing one of the set of sharing users to be displayed on the user-dismissible address interface;
receiving the one or more user inputs, the one or more inputs selecting at least one of the selectable icons displayed on the user-dismissible address interface; and
in response to the one or more inputs, selecting the set of selected sharing users from the set of sharing users;
determining based on the selected set of sharing users, a combined set of shared content, that has been shared with the viewing user by one or more sharing users included in the set of selected sharing users, wherein in response to the one or more inputs selecting the set of selected sharing users, invoking application code of a file sharing service application running on a terminal associated with the viewing user, the application code communicating a call to access information pertaining to one or more files being shared by the one or more sharing users;
displaying at least a subset of shared content in the combined set a user-selectable visual representation of the shared content, the displaying the at least the subset of shared content comprising:
- receiving, via a shared folder filter definition user interface displayed on a display of a mobile terminal, a user input indicating a selected set of shared content to be displayed from among the combined set of shared content; and
- displaying, on a shared folder interface displayed on the display of the mobile terminal, at least part of the selected set of shared content to be displayed;

receiving, via an interface for the user-selectable visual representation, a selection of an object in the subset of shared content; and in response to receiving the selection of the object, performing a call to a file sharing service to access a file corresponding to the object.

* * * * *